United States Patent Office 3,514,458
Patented May 26, 1970

3,514,458
SUBSTITUTION OF BENZO- AND PHENYL-GROUPS ON BENZENE AND NUCLEAR SUBSTITUTED BENZENE, THIOPHENE, FURAN, QUINOLINE, PYRIDINE AND LOWER ALKYL NUCLEAR SUBSTITUTED PYRIDINES BY PYROLYSIS THEREOF WITH PHTHALIC ANHYDRIDE
Ellis K. Fields, Chicago, Ill., assignor to Standard Oil Company, Chicago, Ill., a corporation of Indiana
No Drawing. Continuation-in-part of application Ser. No. 527,067, Feb. 14, 1966. This application June 1, 1967, Ser. No. 642,720
Int. Cl. C07d 33/16
U.S. Cl. 260—283         7 Claims

ABSTRACT OF THE DISCLOSURE

Benzo- and phenyl-type substituted aromatics are prepared by thermal synthesis resulting from the pyrolysis of a mixture of an intramolecular anhydride of an aromatic polycarboxylic acid and an aromatic compound or a heterocyclic compound aromatic in nature. The benzo- and phenyl substituents are believed to occur from the formation of an aryne from the anhydride, such as benzyne from phthalic anhydride, under pyrolysis conditions. The aryne reacts with the aromatic or heterocyclic aromatic in nature by addition to form the benzo-type substituted derivatives and by insertion to form the phenyl-type substituted derivatives. For example, pyrolysis of a mixture of phthalic anhydride and benzene proceeds through addition of benzyne to benzene to produce naphthalene and through insertion to produce biphenyl. The pyrolysis of a mixture of phthalic anhydride and thiophene proceeds through addition to produce some benzothiophenone but mainly benzothiophenothiophene and benzonaphthothiophene and through insertion to produce the two isomeric phenylthiophenes, i.e., the 2-phenyl- and 3-phenylthiophenes.

RELATED APPLICATION

This application is a continuation-in-part of copending application Ser. No. 527,067, filed Feb. 14, 1966 and now abandoned.

BACKGROUND

It is known that benzene by pyrolysis is converted to biphenyl and p-terphenyl among other products. The pyrolysis of chlorobenzene is also known to produce biphenyl, 4-chlorobiphenyl, 4,4'-dichlorobiphenyl and some p-terphenyl.

SUMMARY OF INVENTION

However, it has now been discovered that a mixture of an aromatic carboxylic acid intramolecular anhydride with an aromatic compound or with a heterocyclic compound aromatic in nature can by pyrolysis in a mole ratio of 1 to 60 moles of the aromatic compound or heterocyclic compound aromatic in nature at 600 to 800° C. for 0.5 to 200 seconds and a pressure of 0.1 to 100 atmospheres in the presence of a gas inert under the pyrolysis conditions, e.g. nitrogen, argon or helium, be converted to fused ring compounds and compounds having at least two rings joined by ring carbon-to-ring-carbon. By fused ring compounds are meant those having two or more rings each aromatic in nature joined by at least two carbon atoms common to each ring as in naphthalene, fluorene, benzothiophene, and benzofuran, among others. By joined ring carbon-to-carbon joined rings is meant two or more aromatic in nature rings joined through one carbon of each directly to a carbon of the other ring as in biphenyl, phenylxylenes, fluorobiphenyl, phenylthiophenes, phenylpyridines and phenylfurans among others.

Useful aromatic carboxylic acid intramolecular anhydrides in the pyrolysis synthesis of this invention include compounds such as phthalic anhydride, pyromellitic dianhydride, naphthalic anhydride and derivatives thereof containing as nuclear substituents on ring carbon atoms such substituents as halides, alkoxy groups (R—O—), cyano group, carboalkoxy (ROOC—) groups, $C_1$ to $C_4$ lower saturated alkyl hydrocarbon groups, aryl hydrocarbon groups, thioalkyl (R—S—) groups, dialkylamino ($R_2$—N—) groups and trifluoromethyl (—$CF_3$) groups.

Large anhydrides even perylene can be volatilized by heating in a bulb at 350–450° C. in a stream of nitrogen containing the other reactant such as pyridine, thiophene, or chlorobenzene, the gas stream containing both reactants then directly entering the hot Vycor tube. Another technique we have used is a vertical furnace and a dropping funnel at the top with a large-bore stopcock; the insoluble anhydride is kept in suspension in the other, liquid, reactant by a stirrer, and the suspension is dropped into the vertical hot tube in the hot furnace.

As aromatic compounds and heterocyclic compounds aromatic in nature including the anhydride that are useful in the pyrolysis synthesis of this invention are aromatic hydrocarbons such as benzene, naphthalene, fluorene, and such heterocyclics aromatic in nature that contain in addition to oxygen, sulfur and nitrogen in their ring only carbon and hydrogen atoms and derivatives of said aromatic hydrocarbons and said O—, N— and S— ring-containing heterocyclics aromatic in nature wherein the derivatives have as nuclear substituents such as chlorine, bromine, iodine, fluorine, cyano, trifluoromethyl (—$CF_3$), alkoxy (R—O—), carboalkoxy (ROOC—), $C_1$ to $C_4$ lower saturated hydrocarbon, aryl hydrocarbon, thioalkyl (R—S—), dialkylamino ($R_2$—N—) groups. The O-heterocyclics aromatic in nature include the acid anhydride reactants.

In the foregoing disclosed acid anhydride, aromatic or heterocyclic aromatic in nature reactants, R when $C_1$ to $C_4$ lower saturated alkyl hydrocarbon groups is exemplified by such groups as methyl, ethyl, n-propyl, iso-propyl, n-butyl, sec-butyl, tert. butyl hydrocarbon groups.

The pyrolysis synthesis of this invention is substantially non-catalytic. It can be conveniently carried out by combining the *reactants separately* as a mixture or solution externally and introducing the reactants as vapor or liquid injection with an inert gas sweep into a pyrolysis zone such as in a glass (such as Vycor glass) tube filled with glass (Vycor glass) beads to provide improved reactant contact. The pyrolyzate is collected upon exit from the pyrolysis zone as in a cold trap, cooled and the products separated for example by distillation, fractional crystallization, extraction or any other suitable separation means. Steam distillation is especially useful for product recovery.

Reduced pressure, from below 760 mm. Hg down to 75 mm. Hg imposed on the exit side of a cold trap refrigerated with a coil, jacket or bath can provide the reduced pressure operation of the pyrolysis synthesis of this invention. When the pyrolyzate collector attached to the exit from the pyrolysis zone is open to the atmosphere and the pyrolyzate is cooled with air or water, the pyrolysis operating pressure is substantially atmospheric pressure. The pyrolysis synthesis can be operated above ambient pressure by conducting the pyrolysis synthesis in a closed system at autogenetic pressure, the sum of the partial pressures of reactants, products and gas used for gas sweep. Also higher pressure in a closed system can be used but in this case the reactants and sweep gas must be pressurized for injection into the pyrolysis zone.

The characteristics essential for the aromatic and heterocyclic aromatic in nature reactants useful with the aromatic acid and heterocyclic acid intramolecular anhydride in the method of this invention are the presence of only hydrogen on at least two vicinal ring carbons and the absence of nuclear substituents reactive with the anhydride group per se at the pyrolysis synthesis temperature of 600 to 800° C. The specific nuclear substituents mentioned before will be immediately recognized as constituting known groups known to be not reactive at 600 to 800° C. per se with an intramolecular anhydride group attached to an aromatic ring or rings. The aromatic and heterocyclic intramolecular anhydride reactants should also have absent the nuclear substituents reactive with the anhydride groups per se at the pyrolysis synthesis conditions.

The necessity for the presence of only hydrogen on two vicinal ring carbons in the aromatic and heterocyclic aromatic in nature reactants will be appreciated from the fact that their reaction with the aromatic acid intramolecular anhydride occurs by means of an aryne, such as benzyne, produced from the anhydride when the anhydride group:

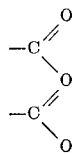

is split or cracked from the aromatic or heterocyclic ring structure. For example, benzyne is the aryne resulting from the splitting off of the anhydride group from phthalic anhydride. Benzyne can be illustrated as

This is not to say that the pyrolysis synthesis of this invention produces only fused ring structure compound products. However, the aryne (benzyne from phthalic anhydride) formation and its reactivity with two hydrogens (one each) on the two vicinal ring carbons has been established as responsible for the appearance of the relatively high occurrence of fused ring compound products formed by the aryne addition to the aromatic or heterocyclic aromatic in nature.

Specific anhydride reactants useful in the pyrolysis synthesis of this invention include phthalic anhydride, pyromellitic dianhydride, mellophanic dianhydride, mellitic trianhydride, carboxy phthalic anhydride (trimellitic anhydride), carboxymethyl phthalic anhydride, 1,8-naphthalic anhydride, naphthalene - 1,2- and -2,3-dicarboxylic anhydrides, naphthalene - 1,4,5,8-tetracarboxylic dianhydride, quinolinic anhydride, cinchomeronic anhydride, pyrazine-2,3-dicarboxylic anhydride, hemipinic anhydride, metahemipinic anhydride, 3,5-dimethoxy phthalic anhydride, 3,6-dimethoxy phthalic anhydride, 3- and 4-methoxy phthalic anhydride, 3- and 4-chlorophthalic anhydride (or the commercially available mixture of the two isomers), tetrachloro-, tetrabromo-, and tetrafluoro-phthalic anhydride, tetraphenyl phthalic anhydride, thiophene-2,3-dicarboxylic anhydride, and the like.

Aromatic reactants useful in the pyrolysis synthesis of this invention include the unsubstituted aromatic hydrocarbons benzene, biphenyl, naphthalene, anthracene, phenanthrene, naphthacene, chrysene, pyrene, indene, fluorine, pentacene, pentaphene, hexaphene, dibenzophenanthrene, and the like and their derivatives wherein from 1 to 2 less than the total hydrogens on ring carbons, these two must be vicinal, are replaced by $C_1$ to $C_3$ alkyl hydrocarbon groups: chloro, bromo, iodo, and fluoro groups, methoxy ethoxy, propoxy alkoxy groups, cyano groups, phenyl groups, methylsulfide, ethylsulfide and propylsulfide alkyl thio groups, dimethylamine, dimethylamino, dipropylamino groups, trifluoro methyl groups, carboxymethyl, carboxypropyl carboxyalkyl groups. These include, of course, toluene, xylenes, 1,2,4-trimethylbenzene, 1,2,3,4-tetramethylbenzene, ethylbenzene, di-ethylbenzenes, 1,2,4 - triethylbenzene, n-propylbenzene, isopropylbenzene, di-n-propylbenzenes, diisopropylbenzenes, 1,2,4-tri-n-propylbenzene, mono-methylnaphthalenes, dimethylnaphthalenes, trimethylnaphthalenes, tetramethylnaphthalenes, penta- and hexa-methylnaphthalenes having at least two vicinal unsubstituted ring carbons, mono-ethylnaphthalenes, diethylnaphthalenes, triethylnaphthalenes, tetraethylnaphthalenes, penta- and hexamethylnaphthalenes having at least two vicinal unsubstituted ring carbons, mono- to octa-methyl biphenyls having at least two vicinal unsubstituted ring carbons, and like $C_1$ to $C_3$ alkyl substituted derivatives of the other named unsubstituted aromatic hydrocarbons, monochlorobenzene, dichlorobenzenes, 1,2,4 - trichlorobenzenes, 1,2,3,4 - tetrachlorobenzenes, monobromobenzene, dibromobenzenes, 1,2,4-tribromobenzene, 1,2,3,4-tetrabromobenzene, monoiodobenzene, diiodobenzenes, 1,2,4 - triiodobenzene, 1,2,3,4 - tetraiodobenzene, mono-fluorobenzene, difluorobenzenes, 1,2,4 - trifluorobenzene, 1,2,3,4 - tetrafluorobenzene, mono- to hexa-chloro-, bromo-, iodo-, fluoro- naphthalenes whose penta- and hexa- derivatives have at least two vicinal unsubstituted ring carbons; mono- to octa- chloro-, bromo-, iodo- and fluoro-biphenyls having at least two vicinal unsubstituted ring carbons; methylphenylsulfide, di(methylmercapto) benzenes, 1,2,4 - tri-(methylmercapto) benzene, 1,2,3,4-tetra - (methylmercapto) benzene, methylmercapto (mono- through hexa-) naphthalenes having at least two vicinal unsubstituted carbons, methylmercapto (mono- through octa-) biphenyls having at least two vicinal unsubstituted carbons, and the like methylmercapto substituted derivatives of the other unsubstituted aromatic hydrocarbons; dimethylaniline, $N_1,N_2$-tetramethyl phenylenediamine, $N_1,N_2,N_3$-hexamethyl-1,2,4-triamino benzene, $N_1,N_2,N_3,N_4$ - octamethyl - 1,2,3,4-tetraaminobenzene, trifluoromethylbenzene, bis - trifluoromethylbenzene, 1,2,4-tris-trifluoromethylbenzene, 1,2,3,4-tetra(trifluoromethyl) benzene, methylbenzoate, dimethylphthalates, trimethyl trimellitate, tetramethyl ester of 1,2,3,4 - benzene-tetracarboxylic acid, ethyl benzoate, diethyl phthalates, triethyl trimellitate, propyl benzoates, dipropyl phthalates, tripropyl trimellitate, methyl naphthoate, dimethyl esters of naphthalene dicarboxylic acids, methyl esters of 4-biphenyl carboxylic acid, dimethyl ester of 4,4'-biphenyl dicarboxylic acid, dimethyl ester of carboxyphenyl indane carboxylic acids, and the like $C_1$ to $C_3$ alkyl esters of aromatic carboxylic acids; and substituted aromatic hydrocarbons containing two or more different members of said substituents as in methyl p-toluic acid, p-chloromethyl benzoate, 3-cyanomethylbenzoate, 1,2-dichloro-4-methyl benzoate, 4-methyl 1,2-dimethylphthalate, 4-fluoro-1,2-dimethylphthalate, 4-methoxy dimethyl aniline, 1,2-dicyano-4-methoxy benzene, 4-cyano o-xylene, 3,4-dimethylmercapto methylbenzoate, and N-dimethylxylidine among others.

Also useful in the pyrolysis synthesis of this invention are the specific O—, N— and S— heterocyclics aromatic in nature including isoquinoline, quinoline, pyridoquinoline, 9-chloro-3-fluoro-acridine, indole, isoquinoline, 2,2-bi-pyridine, 2-(2-thienyl) pyrrolidine, dimethyl 3,5-pyridine dicarboxylate, dimethyl 2,3-quinoline dicarboxylate, thiophene, furan, methyl nicotinate, 2-methyl furan carboxylate, N-dimethyl-2-pyrenamine, 2,6-di(methylamino) pyridine, 1-dimethyl amino acridine, 2-methylmercaptofuran, methylfuroate, 2-methylmercapto thiazole, 2-methylmercaptooxazole, thiazole, oxazole, pyridine, methyl picolinate, coumarone, benzothiofuran, dibenzofuran, dibenzothiophene, phthalic anhydride, naphthalene anhydride and others of the nature and character hereinbefore indicated.

The following illustrative examples will provide a clearer understanding of the nature and scope of the present pyrolysis synthesis invention. All examples, unless otherwise noted, were carried out in a flow system discharging at ambient pressure, one atmosphere.

ANALYTICAL TECHNIQUES USED TO IDENTIFY COMPONENTS OF PRODUCTS

Analyses were performed in one or more of the following ways: by gas chromatography on a column of polyethylene glycol sebacate on Chromosorb W, by comparison of retention times of the components of the product mixture with those of authentic samples; by mass spectrometry with a Consolidated Model 21–103c mass spectrometer with the inlet system at 250° C.; and by a combination of gas chromatography and mass spectrometry, with a directly-coupled gas chromatograph-mass spectrometer also employing a 21–103c instrument with an electron multiplier in place of the Faraday-cup detector. This extremely useful combination that feeds the pure compound separated on a column directly into the mass spectrometer for absolute identification is adequately described by R. S. Gohlke, Analytical Chemistry 31, 535 (1959); L. P. Lindemann and J. L. Annis, ibid., 32, 1742 (1960); and J. T. Watson and K. Biemann, ibid., 36, 1135 (1964).

Mass spectra were measured at the conventional 70 ionizing volts and at low voltage, 7.5 volts, uncorrected. For the low-voltage measurements, the repellers were maintained at an average potential of 3 volts, the exact values being selected to give maximum sensitivity.

Low-voltage mass spectrometry is being increasingly used to determine the identity of compounds in a mixture. It gives the masses of the parent ions and their intensity relative to each other. Sensitivities, that is, the proportionality factors between parent peak intensities and actual concentrations are roughly equal for closely related compounds such as aromatic hydrocarbons, their halogen derivatives, and heterocyclic compounds of aromatic nature such as biphenyls, naphthalenes, phenyl pyridines, phenyl thiophenes, quinoline, benzothiophene, dibenzofuran, and the like (see G. F. Crable, G. L. Kearns, and M. S. Norris, Analytical Chemistry, 32, 13 (1960)).

Example 1

A solution of 1 gram (0.0676 mole) of phthalic anhydride in 20 milliliters (0.166 mole) of o-xylene was pyrolyzed at 700° C. under a nitrogen sweep of 33 milliliters/minute in a Vycor glass tube 25 mm. in diameter, 26 centimeters long, filled with Vycor glass beads, with a contact time of 18.4 seconds. The pyrolyzate was caught in a receiver cooled in crushed ice. For comparison 20 milliliters of o-xylene alone was pyrolyzed under the identical conditions. Weights of products and analyses are shown below:

|  | o-xylene+phthalic anhydride | o-xylene alone |
|---|---|---|
| Products, grams | 1.5 | 1.0 |
| Relatice concentration of: |  |  |
| Naphthalene | 33.2 | 1.3 |
| Methylnaphthalene | 37.5 | 0.3 |
| Dimethylnaphthalene | 35.0 | 0 |
| Phenyl o-xylene | 7.1 | 0 |

Example 23 illustrates the pyrolysis of phthalic anhydride alone.

Example 2

A solution of 2 grams (0.0135 mole) of phthalic anhydride in 45 milliliters (0.325 mole) of p-xylene was pyrolyzed at 690° C. as in Example 1, with a contact time of 11 seconds. For comparison, 45 milliliters of p-xylene alone was pyrolyzed under the identical conditions. Weights of products and analyses are shown below:

|  | p-xylene+phthalic anhydride | p-xylene alone |
|---|---|---|
| Products, grams | 1.094 | 1.0 |
| Relative concentration of: |  |  |
| Methylnaphthalene | 54 | 0 |
| Phenyl-p-xylene | 4 | 0.4 |
| Methyl fluorene | 14 | 0 |

Methyl fluorene is formed by ring closure of phenyl p-xylene:

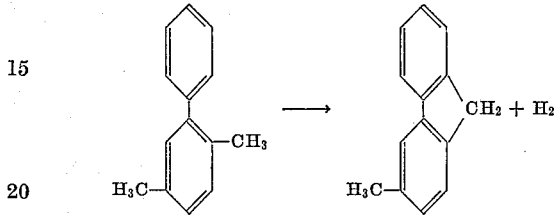

Example 3

Fluorobenzene, 4.65 milliliters (0.05 mole) was passed into a Vycor tube at 690° C. at the same time that 2.96 grams (0.02 mole) of phthalic anhydride was introduced by heating in a stream of nitrogen. The contact time was 7.6 seconds. For comparison, 4.65 milliliters of fluorobenzene alone were pyrolyzed under the identical conditions. The results are shown below:

|  | Fluorobenzene+ phthalic anhydride | Fluorobenzene alone |
|---|---|---|
| Products, grams | 4.2 | 0.6 |
| Relative concentrations of: |  |  |
| Fluoronaphthalene | 112 | 2.4 |
| Fluorobiphenyl | 125 | 41.4 |

Example 4

A solution of 2.96 grams (0.02 mole) of phthalic anhydride in 31.4 milliliters (0.4 mole) of thiophene was pyrolyzed at 690° C. under nitrogen with a contact time of 15.5 seconds. For comparison, 31.4 milliliters of thiophene alone was pyrolyzed under the identical conditions. The results are shown below:

|  | Thiophene+ phthalic anhydride | Thiophene alone |
|---|---|---|
| Products, grams | 2.5 | 0.24 |
| Relative concentrations of: |  |  |
| Benzothiophene | 4.3 | 0.8 |
| Phenyl thiophenes (2-phenyl and 3-phenyl) | 31.7 | 0.6 |
| Benzothiophenothiophene | 47.1 | 0 |
| Benzonaphthothiophene | 32.1 | 0 |

The last two products,

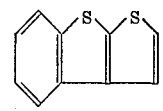

and

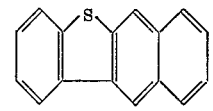

are formed by further reaction of phthalic anhydride with the primary products of reaction of phthalic anhydride and thiophene.

Example 5

A solution of 7.4 grams (0.05 mole) of phthalic anhydride in 50 milliliters (0.62 mole) of pyridine was pyrolyzed at 690° C. under nitrogen with a contact time of 9.6 seconds. For comparison, 50 milliliters of pyridine alone were pyrolyzed under identical conditions. The results are shown below:

|  | Pyridine+ phthalic anhydride | Pyridine alone |
|---|---|---|
| Products, grams | 6.8 | 1.2 |
| Relative concentrations of: |  |  |
| Quinoline | 7.1 | 0.6 |
| Phenylpyridines (2-, 3- and 4- isomers) | 131.4 | 0 |
| Phenylquinoline (5-, 6-, 7- and 8- isomers) | 12.3 | 0 |

Example 6

A solution of 1.48 grams (0.01 mole) of phthalic anhydride in 63.9 milliliters (0.3 mole) of toluene was pyrolyzed at 690° C. under nitrogen with a contact time of 18.3 seconds. For comparison, 63.9 milliliters of toluene was pyrolyzed under the identical conditions. Results are shown below:

|  | Toluene+ phthalic anhydride | Toluene alone |
|---|---|---|
| Products, grams | 3.0 | 0.0 |
| Relative concentrations of: |  |  |
| Naphthalene | 4.9 | 0.5 |
| Methylnaphthalene | 19.9 | 1.0 |
| Methylbiphenyl | 38.0 | 11.7 |
| Fluorene | 37.0 | 1.3 |

Fluorene arises from methylbisphenyl by the same ring-closure shown in Example 2.

Example 7

A mixture of 2.96 grams (0.02 mole) of phthalic anhydride and 14.6 milliliters (0.2 mole) of furan was pyrolyzed at 690° C. under nitrogen with a contact time of 5.7 seconds. The pyrolysate, 3.5 grams, contained these relative concentrations of products:

Benzofuran _____ 19
Naphthalene _____ 100
Phenyl furans (2- and 3-isomers) _____ 363
Dibenzofuran _____ 43
Naphthobenzofuran _____ 63

By contrast, 14.6 milliliters (0.2 mole) of furan alone, pyrolyzed under the identical conditions, gave less than 30 milligrams of product that was not further analyzed.

Example 8

A solution of 14.8 grams (0.1 mole) of phthalic anhydride in 100 milliliters (0.8 mole) of methyl benzoate was pyrolyzed at 700° C. under nitrogen, with a contact time of 33 seconds. The pyrolysate was distilled in vacuo to recover 80 milliliters of methyl benzoate B.P.$_{1.3}$ 53–55°, and obtain the products, 17.1 grams, as the pot residue at 100°/0.5. The relative concentrations of products in the residue were:

Methyl naphthoate _____ 65
Methyl biphenylcarboxylate _____ 100

Methyl benzoate, 100 milliliters, pyrolyzed alone under identical conditions, gave 4.8 grams of product that contained no methyl naphthoate and, on the same scale as above, only 10 of methyl biphenyl carboxylate.

Example 9

A solution of 2.96 grams (0.02 mole) of phthalic anhydride in 6.52 milliliters (0.04 mole) of dimethyl phthalate was pyrolyzed at 690° C. with a contact time of 20 seconds. The pyrolysate weighed 6.8 grams and contained these relative concentrations:

Unreacted dimethyl phthalate _____ 33.8
Methyl naphthoate _____ 6.9
Dimethyl naphthalene dicarboxylate _____ 3.8
Dimethyl biphenyl dicarboxylate _____ 3.5

For comparison, 6.52 milliliters (0.04 mole) of dimethyl phthalate alone, pyrolyzed under identical conditions, gave 3.8 grams pyrolysate that analyzed, on the same scale:

Unreacted dimethyl phthalate _____ 33.8
Methyl naphthoate _____ 0
Dimethyl naphthalene dicarboxylate _____ 0
Dimethyl biphenyl carboxylate _____ 2.1

Example 10

Hexafluorobenzene, 3.92 grams (0.02 mole) was passed into a Vycor tube at 690° C. at the same time that 1.48 grams (0.01 mole) of phthalic anhydride was introduced by being heated in a stream of nitrogen. The contact time was 45 seconds. For comparison, 3.92 grams of hexafluorobenzene alone were pyrolyzed under the identical conditions. The results were:

|  | Hexafluorobenzene+phthalic anhydride | Hexafluorobenzene alone |
|---|---|---|
| Products, grams | 0.70 | 0.03 |
| Relative concentrations of: |  |  |
| Tetrafluoronaphthalene | 21 | 0 |
| Hexafluorobiphenyl | 100 | 0 |

Example 11

A solution of 2.96 grams (0.02 mole) of phthalic anhydride in 11.8 milliliters (0.1 mole) of quinoline was pyrolyzed at 690° C. under nitrogen with a contact time of 26 seconds. For comparison, 11.8 milliliters of quinoline alone were pyrolyzed under the identical conditions. The results were:

|  | Quinoline plus phthalic anhydride | Quinoline alone |
|---|---|---|
| Products, grams | 2.75 | 0.35 |
| Relative concentrations of: |  |  |
| Acridine | 20.7 | 0 |
| Phenyl quinoline (5-, 6-, 7- and 8- isomers) | 100.0 | 0 |

Example 12

Quinoline, 11.8 milliliters, was passed into a Vycor tube at 690° C. at the same time that 0.89 gram (0.005 mole) of 1,8-naphthalic anhydride was introduced by heating in a stream of nitrogen. The contact time was 23.3 seconds. For comparison, 11.8 milliliters of quinoline alone were pyrolyzed under the identical conditions. The results were:

|  | Quinoline plus naphthalic anhydride | Quinoline alone |
|---|---|---|
| Products, grams | 0.75 | 0.35 |
| Relative concentrations of: |  |  |
| Naphthyl quinoline | 64 | 0 |
| Di-naphthyl quinoline | 4 | 0 |

Example 13

A solution of 2.96 grams (0.02 mole) of phthalic anhydride in 27.9 grams (0.3 mole) of 3-picoline was pyrolyzed at 690° C. under nitrogen. The contact time was 26.3 seconds. For comparison, 27.9 grams of 3-picoline were pyrolyzed under identical conditions. The results were:

|  | 3-picoline plus phthalic anhydride | 3-picoline alone |
|---|---|---|
| Products, grams | 4.05 | 2.4 |
| Relative concentrations of: |  |  |
| Methyl naphthalene | 100 | 0 |
| Methyl quinoline | 15.6 | 0 |
| Azafluorene 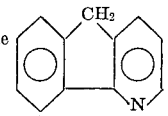 | 31.9 | 0 |
| Phenylpicoline (5- and 6- isomers) | 15.8 | 0 |

The azafluorene arises from ring-closure of phenylpicoline by loss of hydrogen.

Example 14

A solution of 1.92 grams (0.01 mole) of trimellitic anhydride in 40.3 milliliters (0.5 mole) of pyridine was pyrolyzed at 690° C. under nitrogen, with a contact time of 15 seconds. The product weighed 2.7 grams. It contained these relative concentrations:

Phenylpridine _____ 17.5
Naphthoic acid _____ 1.3
Carboxyphenylpyridine _____ 37.0

Example 15

A solution of 1.5 grams (0.01 mole) of quinolinic anhydride in 266.4 milliliters (3 moles) of benzene was pyrolyzed at 690° C. under nitrogen with a contact time of 6.5 seconds. The product, 2.2 grams, contained 4.2% of quinoline and 6.6% of phenylpyridine.

Example 16

A solution of 2.85 grams (0.01 mole) of tetrachlorophthalic anhydride in 32.2 milliliters (0.4 mole) of pyridine was pyrolyzed at 690° C. under nitrogen with a contract time of 13.7 seconds. The product, 2.15 grams, contained 24% of tetrachloronaphthalene and 3% of tetrachlorophenylpyridine.

Example 17

A solution of 1.09 grams (0.005 mole) of pyromellitic dianhydride in 8.24 milliliters (0.08 mole) of benzonitrile was pyrolyzed at 690° C. under nitrogen; the contact time was 20.6 seconds. The product weighed 1.25 grams and contained the relative concentrations of these products:

Phenylbenzonitrile _____ 100
Cyanoanthracene _____ 10
Cyanophenylnaphthonitrile _____ 4
Phenylene dibenzonitrile _____ 7
Dicyanoanthracene _____ 3

Example 18

A solution of 29.6 grams (0.2 mole) of phthalic anhydride in 355.52 milliliters (4 moles) of benzene was passed into a Vycor tube filled with Vycor beads, maintained at 690° C. in an electrically heated furnace, together wtih a stream of dry nitrogen flowing at 20 milliliters/minute and one atmosphere pressure at such a rate as to give a contact time of 22.5 seconds. The pyrolysate was condensed in a receiver cooled in crushed ice.

The pyrolysate was distilled at atmospheric pressure to recover 328.8 milliliters of benzene boiling at 78–82° C. The residue in the pot was steam-distilled. Four liters of condensed steam together with a white solid were collected and filtered; the white solid mixture of naphthalene and biphenyl was dried, then fractionally distilled at atmospheric pressure, using a condenser heated by steam to keep the distillate liquid. The naphthalene was collected at an overhead temperature of 214–225° C.; an intermediate fraction was taken at 226–252° C.; and biphenyl was collected at 253°–260° C. The naphthalene and biphenyl were separately crystallized from 95% ethyl alcohol to give 4.43 grams of naphthalene, M.P. 79–80°, and 21.81 grams of biphenyl, M.P. 70°. The combined yields of naphthalene and biphenyl was 88.4%, based on the phthalic anhydride.

Example 19

Phthalic anhydride, 29.6 grams (0.2 mole), was heated in a bulb maintained at 250° C. while 46.5 milliliters (0.5 mole) of fluorobenzene was passed in together with a stream of dry nitrogen at 20 milliliters/minute and one atmosphere pressure, all three components entering a Vycor tube with Vycor beads, heated at 690° C. in an electric furnace. The issuing vapors were condensed in a receiver maintained at 0° C. Contact time was 13.4 seconds.

The condensate was distilled at atmospheric pressure to recover 12.1 milliliters of fluorobenzene boiling at 79–81° C. The residue in the pot was steam-distilled until 4.5 liters had been condensed. The condensed water-organic mixture was extracted twice with 500 milliliter portions of diethyl ether; the ether solution was dried over Drierite, filtered, and distilled at atmospheric pressure. After the ether was off, the following fractions were collected:

Fraction 1—208–221°, 7.84 grams
Fraction 2—222–250°, 1.62 grams
Fraction 3—251–255°, 11.35 grams Fraction 1 was chilled to −10° C. and filtered cold; the solid remaining on the filter was crystallized from pentane to give 3.8 grams of white crystals, 2-fluoronaphthalene, melting at 60–61°. The filtrate from Fraction 1, 4 grams, by gas chromatography, contained 3.6 grams of 1-fluoronaphthalene and 0.4 gram of 2-fluoronaphthalene.

Fraction 3 was dissolved in 50 milliliters of warm hexane and cooled to 0° C., then filtered. The white solid on the filter was crystallized twice from hexane to give 4 grams of 4-fluorobiphenyl, M.P. 74–75° C., that by gas chromatography was 98.3% pure.

Example 20

A solution of 14.8 grams (0.1 mole) of phthalic anhydride in 80.5 milliliters (1 mole) of pyridine was passed together with dry nitrogen flowing at 20 milliliters/minute at atmospheric pressure into a Vycor tube filled with Vycor beads, maintained at 690° C. in an electrically heated furnace. Contact time was 20.2 seconds. The vapors were condensed in a receiver cooled with chopped ice. The condensate was distilled to recover 63.44 milliliters of pyridine boiling at 113–116° C.; the residue in the pot was cooled, dissolved in 300 milliliters of ether, and extracted with three 100 milliliter portions of 10% aqueous hydrochloric acid. The ether solution was washed with water, dried, and distilled to remove ether; the residue was crystallized from 95% ethyl alcohol to give 5.1 grams naphthalene, M.P. 79°.

The hydrochloric acid extracted was made alkaline was 10% aqueous sodium hydroxide and extracted with three 100 milliliter portions of ether. The ether solution was dried over Drierite, filtered and distilled at atmospheric pressure. After the ether was off, these fractions were collected.

Fraction 1—B.P. 236–238° C., 0.6 gram, quinoline; the picrate melted at 202–3° C.
Fraction 2—B.P. 239–268° C., 1.1 grams
Fraction 3—B.P. 269–275° C., 5.6 grams Fraction 3 by gas chromatography was a mixture of 63% 2-phenylpyridine, 25% 3-phenylpyridine, and 12% 4-phenylpyridine.

Example 21

Thiophene, 628 milliliters, 8 moles, was dropped into a Vycor tube filled with Vycor beads heated at 690° C. together with a stream of dry nitrogen flowing at 20 cc./minute at one atmosphere pressure, and the vapor of 29.6 grams (0.2 mole) of phthalic anhydride, formed by heating it in a bulb at 250° C. Contact time was 12 seconds. The vapors were condensed in a receiver cooled at 0° C. The condensate was distilled to recover 593 milliliters of thiophene, boiling at 83–85° C., and the pot residue was fractionated at atmospheric pressure to give these fractions:

Fraction 1—B.P. 212–223° C., 4.6 grams
Fraction 2—B.P. 224–253° C., 1.2 grams
Fraction 3—B.P. 254–262° C., 16.4 grams Fraction 1 was crystallized from 95% ethyl alcohol to give 3.9 grams of naphthalene, M.P. 79–80° C.

Fraction 3 was crystallized twice from absolute ethanol to give 12.8 grams of 2-phenylthiophene, M.P. 42–43° C.

Example 22

A solution of 74 grams (0.5 mole) of phthalic anhydride in 1008 milliliters (10 moles) of chlorobenzene was pyrolyzed at 690° C. in a Vycor tube filled with Vycor beads, in a stream of dry nitrogen flowing at 20 milliliters/minute, with a contact time of 16.8 seconds. The vapors were condensed in a receiver at 0° C.; the condensate was distilled at atmospheric pressure to recover 878 milliliters of chlorobenzene boiling at 130–133° C. The pot residue was steam-distilled and the steam distillation was interrupted after 7 liters were collected to avoid contamination with less volatile products. The distillate was extracted with 700 milliliters of ether, the ether solution was dried over Drierite, filtered and distilled. After the ether was off the following fractions were collected at atmospheric pressure:

Fraction 1—B.P. 253–260° C., 17.3 grams
Fraction 2—B.P. 261–280° C., 4.4 grams
Fraction 3—B.P. 281–293° C., 22.6 grams Fraction 1 was chilled to 0° C. and filtered cold; the white solid on the filter was crystallized from hexane to give 9.4 grams 2-chloronaphthalene, M.P. 59–60° C. The filtrate of Fraction 1, 7.2 grams, by gas chromatography, was 88% pure 1-chloronaphthalene; the impurities were 2-chloronaphthalene and a little chlorobiphenyl.

Fraction 3 was cooled to 15° C. and filtered cold; the white solid on the filter was crystallized from 95% ethyl alcohol twice to give 9.8 grams of 4-chlorobiphenyl, M.P. 76° C. The filtrate of Fraction 3, 10.74 grams, was dissolved in hexane and cooled to −60° C. in Dry Ice-acetone, then filtered cold. The recrystallization from hexane was repeated to give 7.9 grams of 3-chlorobiphenyl melting at 15°–17° C.

Example 23

Dry nitrogen at 60 cc./minute was passed over a bulb containing 29.6 grams (0.2 mole) of phthalic anhydride heated to 250° C., and on into a Vycor tube filled with Vycor chips heated in an electric furnace to 750° C. Contact time was 4.8 seconds. The condensed vapors were collected in a chilled receiver, then transferred to a sublimation apparatus where 24.6 grams of phthalic anhydride were recovered at a pot temperature of 150° C. and a pressure of 16 mm. Hg. The pot residue was refluxed 4 hours with 200 milliliters of water containing 2 milliliters of concentrated hydrochloric acid, filtered hot and cooled. The white solid was collected on a filter and sucked dry. It was extracted with four 25 milliliter portions of acetone, then crystallized from boiling acetic acid to give 2.05 grams of naphthalene-2,3-dicarboxylic acid, M.P. 238–241° C. (dec.).

The acetone extracts were evaporated and the residue was crystallized twice from boiling water to give 1.44 grams of 4-phenylphthalic acid (biphenyl-3,4-dicarboxylic acid), M.P. 139–194° C. (dec.).

UTILITY

Biphenyl of Example 18 is used as a heat storage agent and heat transfer agent (Chemische Zentralblatt, 1943 I, 1087); a recently developed use is as a fungicide. Paper wrappers are impregnated with biphenyl and wrapped individually around oranges and other citrus fruits; this prevents fungus growth on the orange during storage and transportation; see C. N. Roistacher, L. J. Klotz and M. J. Garber, Phytopathology 50, 855 (1960); M. Ihloff and M. Kalitzki, Deutsche Lebensmaterielle Rundschau, 5, 139 (1960); J. Payne and I. W. Preston, British Patent 794,274.

The chlorobiphenyls of Example 22 and fluorobiphenyls of Example 19 are useful as vapor-phase fungicides; L. Beraha and D. Powell, Phytopathology 43, 383 (1953).

Biphenyl carboxylic acid, obtainable from methyl biphenylcarboxylate of Example 8 and from phenyl benzonitrile of Example 17, by refluxing with 10 volumes of 10% sulfuric acid for 8 hours, cooling and filtering, is used at 40–100% along with a little fatty acids as a modifier for alkyd resins by condensing with polyols; R. L. Heinrich, D. A. Berrg, and R. J. Dick, U.S. Pat. No. 2,982,747 state that films with these modifiers as well as those using naphthoic acids (from the methyl naphthalenes of Example 1 by oxidation as shown by Serres and Fields, U.S. Pat. No. 3,150,172) gave quicker tack-free drying and had much higher Sward hardness and chemical resistance than films from alkyds without these modifiers.

Quinoline of Example 20 can be oxidized by nitric acid or potassium permanganate to nicotinic acid for use as supplement in human and animal nutrition: Kirk-Othmer, Encyclopedia of Chemical Technology, 11, 396, Interscience, New York, 1953; quinoline is used as a flotation agent, K.-O., 11, 397.

Naphthoic acids, produced by oxidation of the methylnaphthalenes of Example 1 as by nitric acid or by air with Co, Mn, and Br catalysts (C. Serres and E. K. Fields, U.S. Pat. 3,150,172) are useful as the cadmium oxide complex from CdO, the naphthoic acid, water and isobutyl alcohol in a ball mill, as heat and light stabilizers for polyvinyl halides; British Pat. 799,568; converting to tartaric acid esters as a resolving agent for optically active bases, Swiss Pat. 307,322; incorporating into phenolic-resin molding compositions to increase fluidity in the molten state and provide even distribution among the filler particles, British Pat. 853,940.

Methylnaphthalenes of Example 1 at 0.5–5% by weight in oil as an impregnating agent for electrical condensers, German Pat. 1,031,889; mono- and di-methylnaphthalenes of Example 1 in weed-killing formulations, both as solvents and to enhance the weed-killing properties, U.S. Pat. 2,782,111.

The phenylpyridines of Example 20 are converted to their phosphate salts with excess phosphoric acid and an aqueous solution thereof is used to bathe mild steel, zinc and aluminum to protect them against rust, U.S. Pat. 2,766,153.

Acridine of Example 11 is used to inhibit corrosion of aluminum in contact with HCl (liquid or fumes); J. Sundararajan, J. Sci. Ind. Research, 20D, 137 (1961); Corrosion Technology, 7, 207 (1960); ibid., 8, 233 (1961).

Also, prior utility for some of the products previously mentioned are found in the references hereafter mentioned.

Methyl napthalene: as dielectric, U.S. Pat. 2,508,099; as bactericide, U.S. Pat. 2,572,855.

Dimethyl naphthalene: as herbicide, C.A. 45, 2132h (1951); for chemical separation, British Pat. 686,278.

The old, expired U.S. patents to Jaeger teach vapor phase catalytic oxidations of naphthalene and methyl naphthalenes and U.S. Pat. No. 2,833,816 teach their oxidation by catalytic liquid phase oxidation.

Benzothiophene: as insecticide, Netherlands Pat. 79,480.

Fluorene: reaction with sulfur to give cotton dyes, British Pat. 571,931.

Tetrachloronaphthalene: for paper coating, U.S. Pat. No. 2,584,852.

Naphthalene: as insecticide—well-known "mothballs."

Acridine: as building block fundamental to acridine dyes such as chrysaniline (yellow) for leather and cotton and to antiseptics such as proflavine and acriflavine. (Textbook of Organic Chemistry by E. Wortheim, 1939 by P. Blakiston's Son & Co. Inc., pages 641 and 649.)

What is claimed is:

1. A method of preparing benzo- and phenyl-substituted benzene hydrocarbons having 0–4 nuclear substituents consisting of halogen, alkyl hydrocarbon group of 1 to 4 carbon atoms and carboalkoxy groups whose alkyl group has 1 to 4 carbon atoms; thiophene; furan; quinoline; or pyridine having 0–3 nuclear alkyl hydrocarbon groups substituents of 1 to 4 carbon atoms which comprises reacting phthalic anhydride with from 1 to 60 moles of benzene hydrocarbons having 0–4 nuclear substituents consisting of halogen, alkyl hydrocarbon group of 1 to 4 carbon atoms; carboalkoxy groups whose alkyl group has 1 to 4 carbon atoms and at least two vicinal hydrogens; thiophene; furan; quinoline; or pyridine having 0–3 nuclear alkyl hydrocarbon substituents of 1 to 4 carbon atoms and at least two vicinal hydrogens per mole of phthalic anhydride, conducting said reaction under flow conditions in the presence of a sweep gas consisting of nitrogen, argon or helium in a reaction zone for 0.5 to 200 seconds at a temperature of 600 to 800° C. and a pressure of 0.1 to 100 atmospheres and separating said benzo- and phenyl-substituted products from the oxidation zone effluent.

2. The method of claim 1 wherein nitrogen is the sweep gas.

3. The method of claim 2 wherein phthalic anhydride is reacted with xylene to produce naphthalene, mono- and dimethyl naphthalene and phenyl-substituted xylene.

4. The method of claim 2 wherein phthalic anhydride is reacted with fluorobenzene to produce fluoronaphthalene and fluorobiphenyl.

5. The method of claim 2 wherein phthalic anhydride is reacted with thiophene to produce benzothiophene, 2- and 3-phenylthiophene, benzothiophenothiophene and benzonaphthothiophene.

6. The method of claim 2 wherein phthalic anhydride is reacted with pyridine to produce quinoline; 2-, 3- and 4-phenylpyridine and 5-, 6-, 7- and 8-phenylquinoline.

7. The method of claim 2 wherein phthalic anhydride is reacted with furan to produce benzofuran, 2- and 3-phenylfuran, dibenzofuran and naphthobenzofuran in admixture with naphthalene.

References Cited

UNITED STATES PATENTS

| | | | |
|---|---|---|---|
| 2,624,664 | 1/1953 | Mowry et al. | 260—330.5 X |
| 2,735,853 | 2/1956 | Moeller | 260—330.5 X |
| 2,938,913 | 5/1960 | Weyker et al. | 260—546 X |
| 3,207,799 | 9/1965 | Saymond | 260—670 |
| 3,278,552 | 10/1966 | Greering | 260—330.5 |
| 3,280,143 | 10/1966 | Hayes | 260—546 X |
| 890,588 | 6/1908 | Meyer | 260—289 |
| 2,351,391 | 6/1944 | Bergstrom | 260—289 |

DONALD G. DAUS, Primary Examiner

U.S. Cl. X.R.

260—250, 279, 283, 287, 288, 290, 295, 295.5, 296, 319.1, 326.82, 329, 330.5, 332.2, 332.8, 345.1, 346.2, 347.5, 465, 465.4, 465.8, 469, 515, 524, 546, 576, 609, 649, 650, 670, 687

PO-1050
(5/69)

UNITED STATES PATENT OFFICE
CERTIFICATE OF CORRECTION

Patent No. 3,514,458　　　　　　　Dated　May 26, 1970

Inventor(s) Ellis K. Fields

It is certified that error appears in the above-identified patent and that said Letters Patent are hereby corrected as shown below:

Column 7, line 29: "methylbisphenyl" should read -- methylbiphenyl --

Column 9, line 10: "Phenylpridine" should read -- Phenylpyridine --

Column 9, lines 24-25: "contract" should read -- contact --

Column 10, line 42: second occurrence of "was" should read -- with --

Column 11, line 60: "M.P. 139-194°C." should read -- M.P. 193-194°C. --.

SIGNED AND
SEALED
SEP 15 1970

(SEAL)
Attest:

Edward M. Fletcher, Jr.
Attesting Officer

WILLIAM E. SCHUYLER, JR.
Commissioner of Patents